United States Patent [19]
Abraham et al.

[11] Patent Number: 4,809,264
[45] Date of Patent: Feb. 28, 1989

[54] COLLISION SIGNAL DETECTION SYSTEM

[75] Inventors: Menachem Abraham, Lexington; Yoseph Linde, Nedham; Gordon C. Saussy, Brighton, all of Mass.

[73] Assignee: Chipcom Corporation, Mass.

[21] Appl. No.: 83,705

[22] Filed: Aug. 7, 1987

[51] Int. Cl.$^4$ .............................................. H04J 1/02
[52] U.S. Cl. ...................................... 370/76; 370/75; 370/124
[58] Field of Search ................... 370/76, 124, 121, 75, 370/69.1, 74, 123, 118, 85

[56] References Cited

U.S. PATENT DOCUMENTS

| | | | |
|---|---|---|---|
| 4,500,990 | 2/1985 | Akashi | 370/85 |
| 4,516,122 | 5/1985 | Tomikawa | 370/85 |
| 4,606,048 | 8/1986 | Sasaki et al. | 370/76 |
| 4,608,559 | 8/1986 | Friedman et al. | 370/85 |
| 4,646,361 | 2/1987 | Usui | 370/85 |
| 4,723,239 | 2/1988 | Schwartz | 370/85 |
| 4,723,311 | 2/1988 | Moustakas et al. | 370/85 |

Primary Examiner—Douglas W. Olms
Assistant Examiner—Melvin Marcelo
Attorney, Agent, or Firm—McGlew and Tuttle

[57] ABSTRACT

A collision signal detection system for shared, multi-user, frequency-division-multiplexed transmission media includes a plurality of listening stations connected to the shared, multi-user, frequency-division-multiplexed transmission media. The listening stations receive and transmit signals including data signals within a databand. A collision signal means is associated with each of the plurality of listening stations for sending a collision enforcement signal from one of the plurality of listening stations to the other ones of the plurality of stations after a data collision has been detected at the first station, the collision enforcement signal having a frequency within the data band. A central station is provided with an input connected with the output of each of the listening stations and an output connected with the input of each of the listening stations with all signals passing through the central station. Signal detection means is provided in the central station for receiving an input signal and for detecting the collision enforcement signal.

13 Claims, 6 Drawing Sheets

COLLISION SIGNAL DETECTION SYSTEM

FIELD AND BACKGROUND OF THE INVENTION

The invention relates to a collision signalling method and system for shared, multi-user, frequency-division-multiplexed transmission media especially broad band cable or the like.

In the past, several systems have been developed for the sharing of information by many stations using a single medium. The networking of the several stations involves numerous problems including problems relating to the sharing of a single medium by several stations.

A networking scheme known primarily by the name ETHERNET uses a single medium shared by many stations. The protocol used is termed carrier sense, multiple access with collision detection or CSMA/CD.

Because a single medium is shared by several stations, all stations on the network continuously monitor the medium for activity. This is termed carrier sense. Only one station may use the medium at any given time, so if there is activity on the network, no station will try to interrupt, but will wait until the activity is over.

If there is no activity on the medium any station may begin to transmit due to the multiple access nature of a single medium shared by a plurality of stations. Because the stations are separated in space and time, two or more stations may start to transmit at about the same time. This simultaneous or nearly simultaneous use of the single medium results in what is termed a collision.

Due to the nature of the medium, a collision destroys the data being sent. Each transmitting station is required to detect the collision (collision detection) and re-transmit the packet of data at a later time. Also, because every transmitting station must know about the collision condition in order to initiate a retransmission, it is required that all transmitting stations detect 100% of the collision events that occur. It is highly desireable that stations only receiving network data and not transmitting be notified about collision events.

If the system does not provide 100 percent collision detection, occasional packets of data will be destroyed by collisions and will never be re-transmitted. This loss of data must be minimized in network systems.

All implementations of CSMA/CD Network System (I.E.E.E. Standard 802.3) provide for 100 percent collision detection. The method of collision detection will depend on the medium used.

IEEE 802.3 Standards 10Base5 and 10 Base2 use a data/collision sensing scheme wherein each station transmits two signals onto the medium. The first signal is a 10 MHz modulated data signal containing the actual packet. The other signal is a DC level. When two or more stations attempt to transmit at the same time, the DC levels add up. Due to the addition of the DC levels and the negligible medium attenuation at low frequencies, all of the stations on the baseband network can readily sense the DC level and thereby determine if there has been a collision.

In Broadband CSMA/CD (I.E.E.E. 802.3, Section Standard 10 Broad 36), the situation is necessarily a great deal more complex. Due to the fact that this system uses broadband cable similar to television cable, no DC signal may be injected. That is in broadband network systems all signals on the cable must be transmitted in the 5 MHz–500 MHz band. Generally, whenever there is a collision, one of the stations involved in the collision is guaranteed to detect the collision. That station then notifies all other stations of the collision by transmitting a signal in a separate collision channel. The separate collision channel is at a frequency different from the data frequency, and therefore does not interfere with data in the data channel or data band. All stations then monitor this channel for activity.

Although the Broadband CSMA/CD system is not exactly analogous to the Baseband DC method both of these methods and systems require separate channels, or separate bands on the cable for data and collision signalling. That is, it is necessary to have a separate data band and a separate collision band so as to enable a station to monitor the collision band so no packets of data will be destroyed by collision. This use of a separate band necessarily also entails a use of part of the medium exclusively for a collision signal. Additionally there is a forfeiture of band space which could have otherwise been used for the data band.

SUMMARY AND OBJECT OF THE INVENTION

It is an object of the invention to provide a broadband CSMA/CD networking system wherein the collision enforcement signal has a frequency within the data-band.

Another object of the invention is to provide a system wherein a collision signal having a frequency within the data band may be detected by a station.

A further object of the invention is to provide a data/collision sensing system associated with each of a plurality of stations or associated with a central nodal station so as to determine when one station is transmitting data and there is no collision, when collision enforcement is being transmitted regardless of data transmission, and to have a probability of detecting a collision condition when multiple stations are transmitting and there is no collision enforcement.

The invention is based on the recognition that the above systems using separate collision and data bands could advantageously be replaced by a system and method for shared, multi-user, frequency-division-multiplexed transmission media which uses the data channel for both data and collision signalling without effecting the normal flow of data. However, a station receiving the signal which includes both data and collision signalling on a single data channel cannot separate the data from the error enforcement signal by filtering, since the error enforcement signal is within the frequency band of the data channel.

Accordingly, it is an object of the present invention to provide a system and method for collision signalling for use with shared, multi-user, frequency-division-multiplexed transmission media which uses the data channel for both data and collision signalling without affecting the normal flow of data (i.e., no interruption of the bit stream, no special codes in the data, and no exclusive use of system bandwidth for collision signalling).

According to the invention, a collision signalled detection system is provided which includes a plurality of stations connected to a shared, multi-user, frequency-division-multiplexed transmission media wherein each of the stations is adapted to receive and transmit data signals. Each of the plurality of stations may includes a collision signal means or collision enforcement signal generator for sending a collision enforcement signal after a data collision has been detected at the given one of the plurality of stations. The collision enforcement signal which is sent is of a frequency within the data band. A signal detection means is preferably provided for detecting when one station is transmitting data and there is no collision, when collision enforcement is being transmitted regardless of data transmission, and to have a probability of detecting a collision condition when multiple stations are transmitting and there is no collision enforcement. The collision enforcement signal detection means may either be provided in each of the stations or a central nodal station may be provided which includes a the collision enforcement signal detection means.

The collision enforcement signal detection means preferably includes a carrier recovery loop or demodulator to recover the correct carrier from the data when there is only one station transmitting and to produce a carrier at the correct frequency when there are multiple stations transmitting, or when the collision enforcement signal is received. The produced carrier, or the recovered carrier is preferably conditioned by a phase shifter and then in turn multiplied with the input signal. The phase shifting function may also be included as a feature of the carrier recovery loop. After the conditioned signal has been multiplied with the input signal the resulting signal may then be evaluated so as to determine when one station is transmitting data and there is no collision, when collision enforcement is being transmitted regardless of data transmission, and to have a probability of detecting a collision condition when multiple stations are transmitting and there is no collision enforcement.

A further object of the invention is to provide a system which is simple in design, provides for 100 percent collision detection and is economical to manufacture.

The various features of novelty which characterize the invention are pointed out with particularity in the claims annexed to and forming a part of this disclosure. For better understanding of the invention, its operating advantages and specific objects attained by its uses, reference is made to the accompanying drawings and descriptive matter in which preferred embodiments of the invention is illustrated.

DESCRIPTION OF THE PREFERRED EMBODIMENTS

Figure 1:
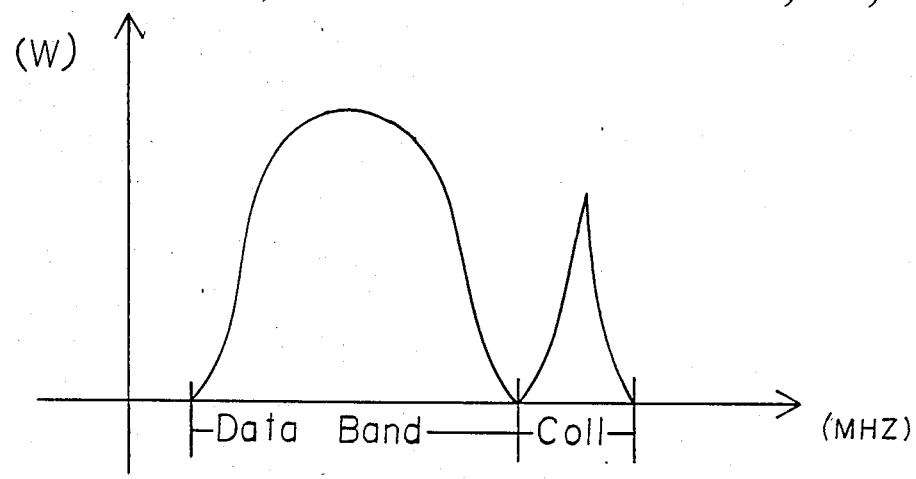
FIG. 1, is a graph with the abscissa axis showing power and the ordinate axis showing frequency, the graph showing the data band and collision band according to the prior art.
Figure 2:
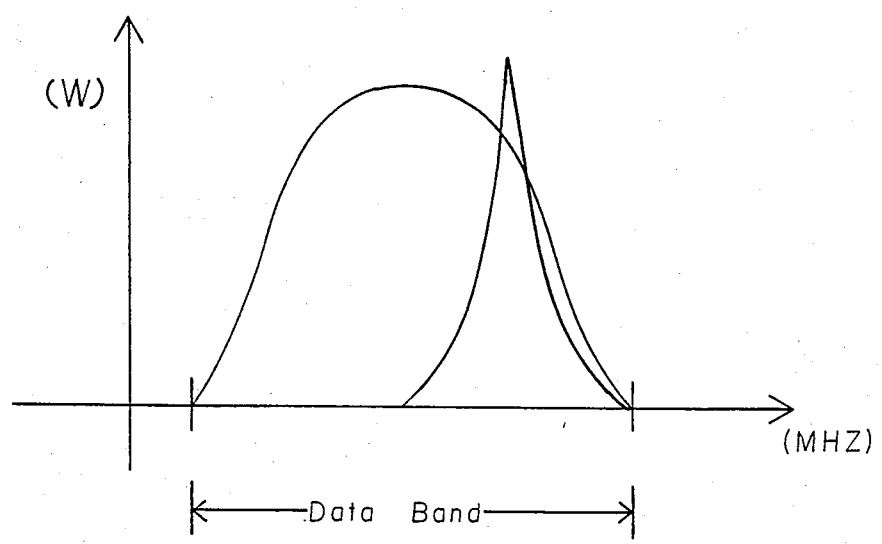
FIG. 2, is a graph having the same abscissa and ordinate axis as FIG. 1 but showing the large data band with collision signal therein according to the present invention.
Figure 10:
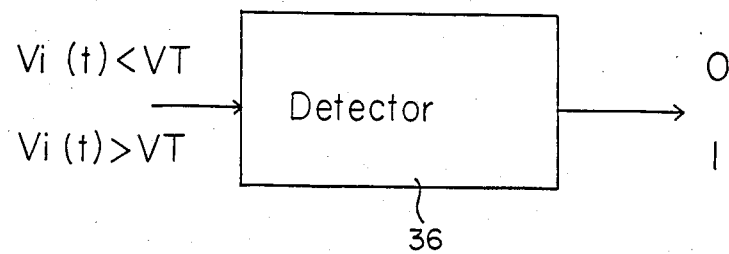
FIG. 10, is a schematic view showing the input output relationship of the detector; and, FIG. 11, is a schematic view showing the carrier detect associated with the listening stations and the carrier drop means associated with a central station.
Figure 3A:
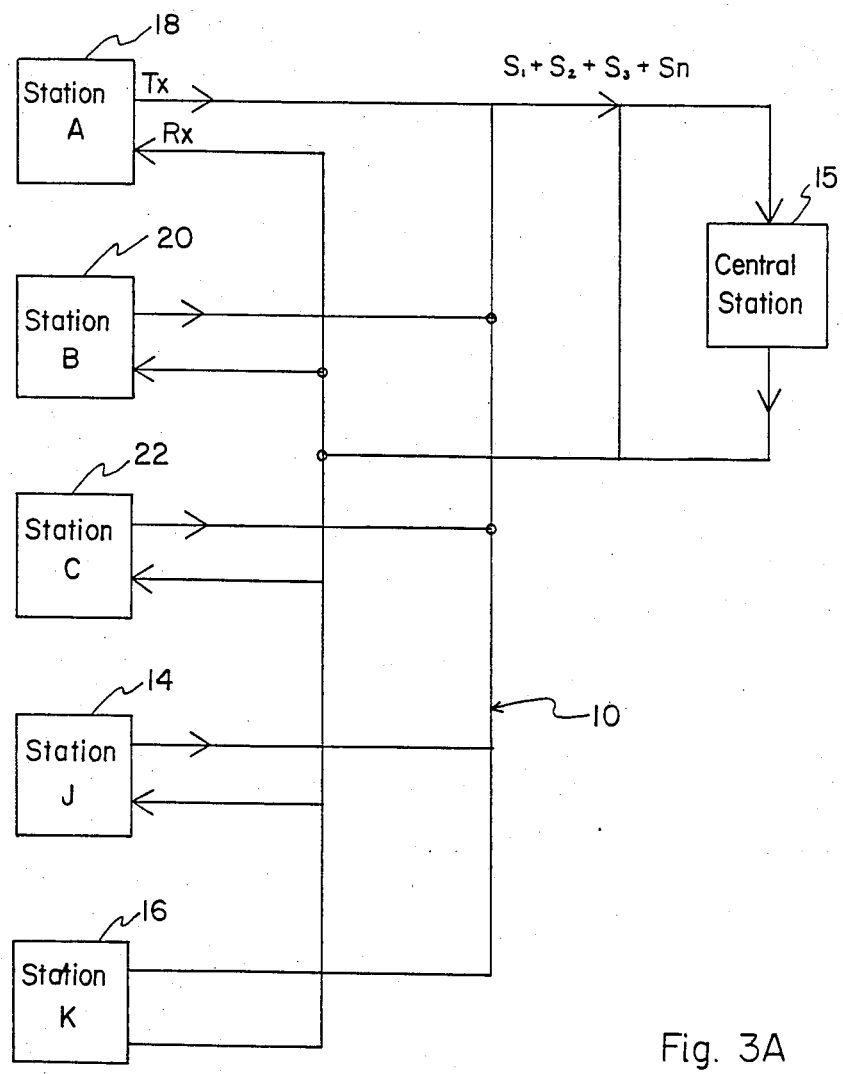
FIG. 3A, is a schematic view showing the plurality of stations connected to a central, nodal station by a shared, multi-user, frequency-division-multiplexed transmission medium according to one embodiment of the invention.
Figure 3B:
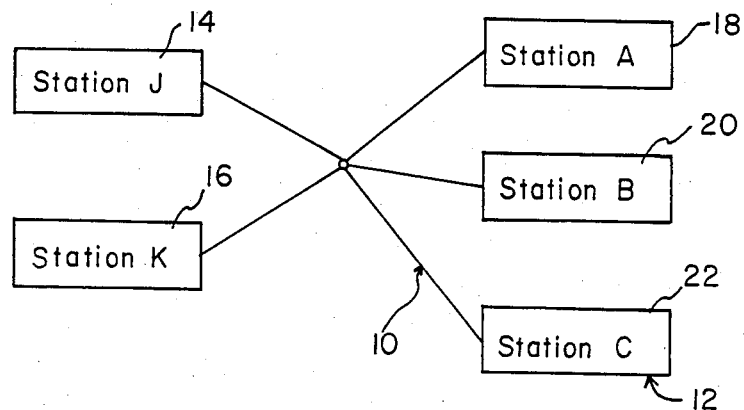
FIG. 3B, is a schematic view showing the plurality of stations connected by a shared, multi-user, frequency-division-multiplexed transmission medium according to another embodiment of the invention.
Figure 4:
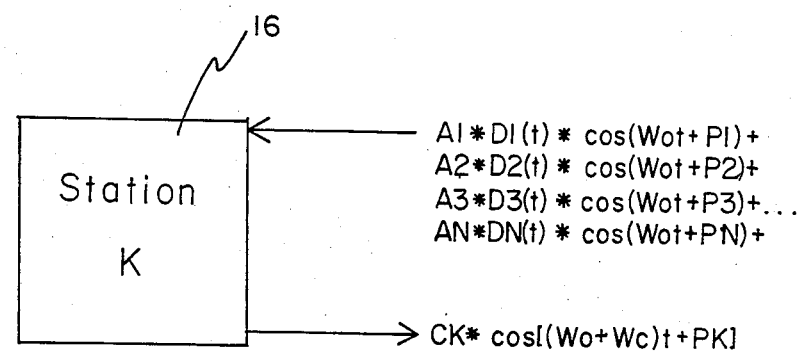
FIG. 4, is a schematic view showing a station receiving data from a plurality of stations and sending a collision enforcement signal.
Figure 5:
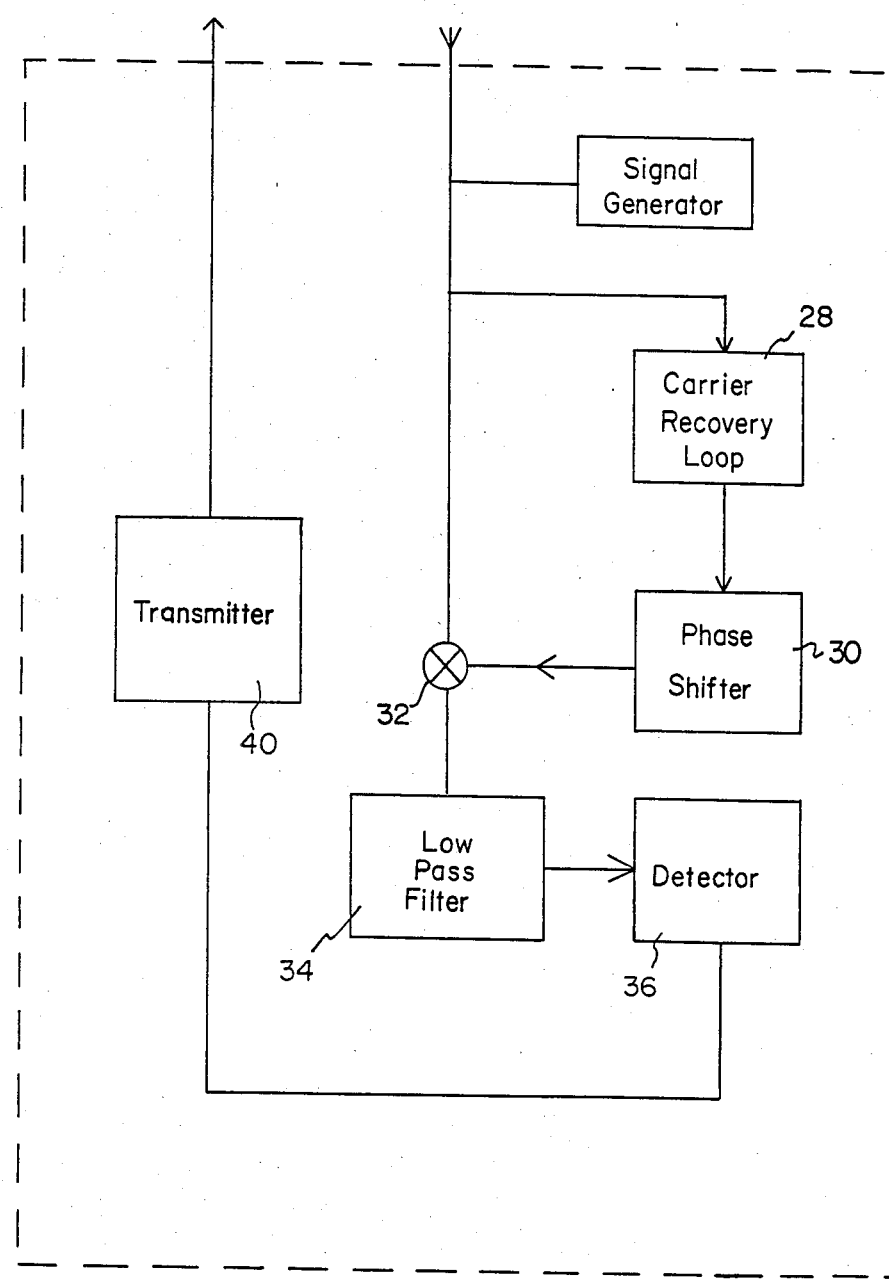
FIG. 5, is a schematic view of a station including a signal detection means according to the present invention.
Figure 6:
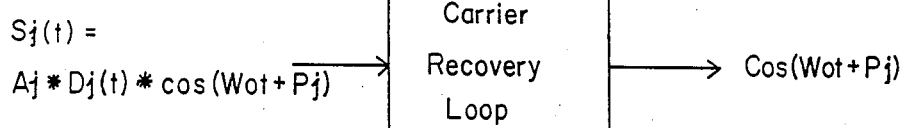
FIG. 6, is a schematic view showing the input of the carrier recovery loop when only one station is transmitting and the output of the carrier recovery loop when only one station is transmitting.
Figure 7:
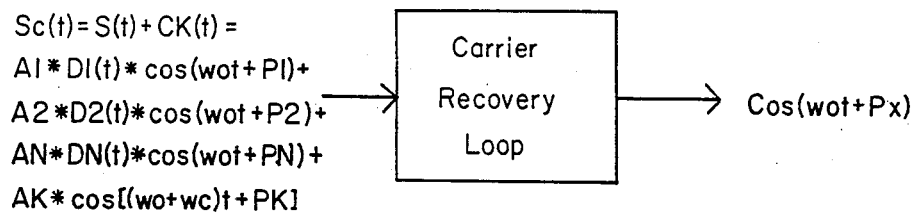
FIG. 7, is a schematic view showing the input of the carrier recovery loop when a plurality of stations are transmitting and collision enforcement is present and the output of the carrier recovery loop when a plurality of stations are transmitting and collision enforcement is present.
Figure 8:
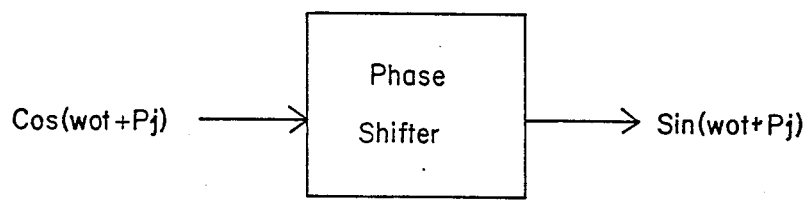
FIG. 8, is a schematic view showing the output of the carrier recovery loop being conditioned by a phase shifter.
Figure 9:
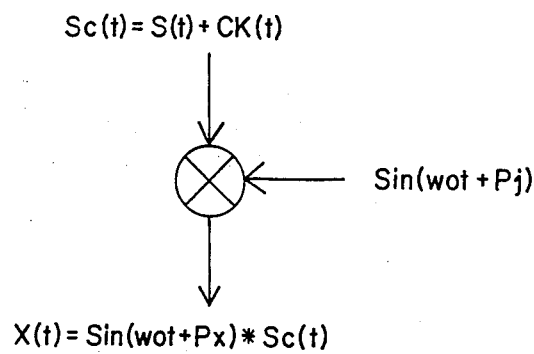
FIG. 9, is a schematic view showing the phase shifter condition signal being multiplied by the input signal and the output of the multiplier.

In accordance with the invention a shared, multi-user, frequency-division-multiplexed transmission medium, or broadband cable generally designated 10 is provided networking a plurality of stations 12 appropriately connected to the shared, multi-user, frequency-division-multiplexed transmission medium. As seen in FIGS. 3A and 3B, the broadband cable 10 may connect a plurality of Stations including Station J labeled 1 4, Station K labeled 16, Station A labeled 18, Station B labeled 20 and Station C labeled 22 etc.

Each of the Stations 14–22 preferably includes a signal generator 24 for producing a collision enforcement signal which has a frequency within the databand.

Each of the plurality of stations 12 may include a collision enforcement signal detection mean generally designated 26 (see FIG. 3B). Preferably, only a single central nodal station 15 includes the collision enforcement signal detection means (see FIG. 3A). According to the embodiment of FIG. 3A all signals must pass through the node 15, before being received by the listening stations 14, 16, 18, 20 and 22 and the collision enforcement detection as described below takes place in node or central station 15 only. Station 15 then signals collision to all other stations (listening stations) by dropping or briefly turning off and on the RF carrier of the data signal. The advantage of the embodiment of FIG. 3A is that the complex collision detection process is only occurring in one place.

The topology of broadband cable allows the introduction of the regenerative central node 15. In other broadcast media (e.g., transmission in the air), the introduction of a central node may not be feasible. The preferred implementation would then require the full collision enforcement detect circuit, according to the invention, in all the stations 12.

Signal detection means 26 preferably includes a carrier loop 28 connected downstream of the input into the Station. The output of the carrier loop is conditioned by a phase shifter 30, and the output of the phase shifter is multiplied with the input to the station at multiplier 32. The output of the multiplier 32 is fed into a low pass filter 34. The output of low pass filter 34 is fed into a detector 36.

The detector 36 is preferably a comparator circuit. In general the detector circuit is a system element which discerns the presence of a certain input condition and signals the presence of this condition on its output. According to the preferred embodiment the detector is a simple DC Voltage Detector.

Detector 36 is described by the following relations:
VT=Threshold Level (a characteristic of a detector)
The input=Vi(t);
The output=Vo(t)

| For Given Input: | The Resulting Output |
|---|---|
| Vi(t) < VT | 0 (corresponds to no detection) |
| Vi(t) > VT | 1 (corresponds to detection) |

The output of the detector 36 is fed into a detector circuit which receives a signal from detector 36 and detects the presence of a carrier drop.

The data signal from a Station J is mathematically described by:

$$Sj(t) = Aj*Dj(t)*\cos(wot+Pj), \quad (1)$$

where
Aj=transmit level of Station j,
Dj(t)=data transmitted by Station j,
cos (wot+Pj)=RF carrier wave at frequency wo, When multiple stations are transmitting on the medium (i.e., a collision condition), the composite signal seen on the cable is:

$$S(t) = A1*D1(t)*\cos(wot+P1) + A2*D2(t)*\cos(wot+P2) + A3*D3(t)*\cos(wot+P3) + \ldots + AN*DN(t)*\cos(wot+PN),$$

where N=total number of transmitting stations.

As with the IEEE 10Broad36 standard (described above), at least one of the transmitting stations (termed Station k) is guaranteed to detect the collision condition. This station then asserts a signal of the following form:

$$Ck(t) = Ak*\cos[(wo+wc)t+Pk],$$

where wc=a low frequency, such that the frequency (wo+wc) falls within the data band.

This is called a Collision Enforcement signal.

Therefore, the composite signal seen on the cable when collision enforcement is present is:

$$Sc(t) = S(t) + Ck(t).$$

A station receiving this signal cannot separate S(t) from Ck(t) by filtering, since Ck(t) is within the frequency band of S(t).

According to the invention the signal received, either at each station (FIG. 3B) or at the central station 15 (FIG. 3A) is fed into a Carrier Recovery Loop 28. The output of carrier recovery loop 28 is defined as follows:

| Given input: | Output will be: |
|---|---|
| Sj(t) = Aj*Dj(t)*cos(wot + Pj) | cos(wot + Pj). |
| Sc(t) = S(t) + Ck(t) = A1*D1(t)*cos(wot + P1) + A2*D2(t)*cos(wot + P2) + ... AN*DN(t)*cos(wot + PN) + | |

| -continued | |
|---|---|
| Given input: | Output will be: |
| AK*cos[(wo + wc)t + Pk] | cos(wot + Px), | where Px is some random phase. The purpose of the Carrier Recovery Loop is to (1) recover the correct carrier from the data when there is only one station transmitting, and (2) produce a carrier at the correct frequency when there are multiple stations transmitting, or When the Collision Enforcement signal is received.

The output of the Carrier Recovery Loop may be conditioned by a Phase Shifter. This circuit performs as follows:

| Given input: | Output will be: |
|---|---|
| cos(wot + Pj) | sin(wot + Pj). |

The resulting signal is multiplied with the input. In the general case, this produces:

$$\begin{aligned} V(t) &= \sin(wot + Px)*Sc(t) \\ &= \sin(wot + Px)*[S(t) + Ck(t)] \\ &= \sin(wot + Px)*A1*D1(t)*\cos(wot + P1) + \\ &\quad \sin(wot + Px)*A2*D2(t)*\cos(wot + P2) + \ldots \\ &\quad \sin(wot + Px)*AN*DN(t)*\cos(wot + PN) + \\ &\quad \sin(wot + Px)*Ak*\cos[(wo + wc)t + Pk]. \end{aligned}$$

Using the identity $$\sin(a)*\cos(b) = \tfrac{1}{2}*\sin(a-b) + \sin(a+b),$$

the expression may be expanded:

$$\begin{aligned} V(t) = & 1/2*A1*D1(t)*[\sin(Px - P1) + \\ & \sin(2wot + Px + P1)] + \\ & 1/2*A2*D2(t)*[\sin(Px - P2) + \\ & \sin(2wot + Px + P2)] + \ldots \\ & 1/2*AN*DN(t)*[\sin(Px - PN) + \\ & \sin(2wot + Px + PN)] + \ldots \\ & 1/2*Ak*[\sin(-wct + Px - Pk) + \\ & \sin(2wot + wct + Px + Pk)] \end{aligned}$$

This signal V(t) is applied to a Low Pass Filter. The characteristic of the filter is to reject all signals of a higher frequency than wc. The resulting signal V(t) will then consist of the following:

$$\begin{aligned} V(t) = & 1/2*A1*D1(t)*[\sin(Px - P1)] + \\ & 1/2*A2*D2(t)*[\sin(Px - P2)] + \ldots + \\ & 1/2*AN*DN(t)*[\sin(Px - PN)] + \\ & 1/2*Ak*[\sin(-wct + Px - Pk)]. \end{aligned}$$

This signal V(t) may be evaluated under three circumstances of interest:

(1) One station transmitting, no collisions.

$$V(t) = 1/2*A1*D1(t)*[\sin(Px - P1)]$$
$$= 1/2*A1*D1(t)*[\sin(P1 - P1)]$$
$$= 1/2*A1*D1(t)*[\sin(0)]$$
$$= 0$$

(Recall from above that the output of the Carrier Recovery Loop will be phase locked to the input when only one input is present.)

Since V(t)=0 is the input to the detector, there will be no collision detection as this will be below the threshold level when there is only one station transmitting.

(2) Multiple stations transmitting, no collision enforcement.

$$Y(t) = 1/2*A1*D1(t)*[\sin(Px - P1)] +$$
$$1/2*A2*D2(t)*[\sin(Px - P2)] + \ldots +$$
$$1/2*AN*DN(t)*[\sin(Px - PN)].$$

The coefficients sin(Px−P1), sin (PX−P2), ..., sin(Px−PN) are random and constant, depending on the random carrier phase Px resulting from multiple inputs on the Carrier Recovery Loop. In general, there will be a probability of detection (sufficient input to trigger the detector) between zero and one.

(3) Multiple stations transmitting, one station enforcing collision.

$$Y(t) = 1/2*A1*D1(t)*[\sin(Px - P1)] +$$
$$1/2*A2*D2(t)*[\sin(Px - P2)] + \ldots +$$
$$1/2*AN*DN(t)*[\sin(Px - PN)] +$$
$$1/2*Ak*[\sin(-wct + Px - Pk)].$$

In the worst case, Px=P1=P2= ... =PN, and all the data terms are zero. The final term, however, will be $$Y(t)=\frac{1}{2}*Ak*[\sin(-wct+Px-Pk)],$$

which is a time-varying function and cannot remain zero and will necessarily vary to be greater than the detector threshold level. Therefore, a full level ($\frac{1}{2}$*Ak) input is guaranteed to the detection within 1 cycle of sin(−wct+Px−Pk).

When the collision is detected at the Head End of station 15, it must then be signalled back to the stations 14 and 16–22. This is also done in band. The Head End will drop the RF carrier for a short interval, guaranteeing that the RF Carrier Detect of the listening stations will deactivate (Carrier Detect is the output of a circuit which continuously monitors the channel for energy).

Figure 11:
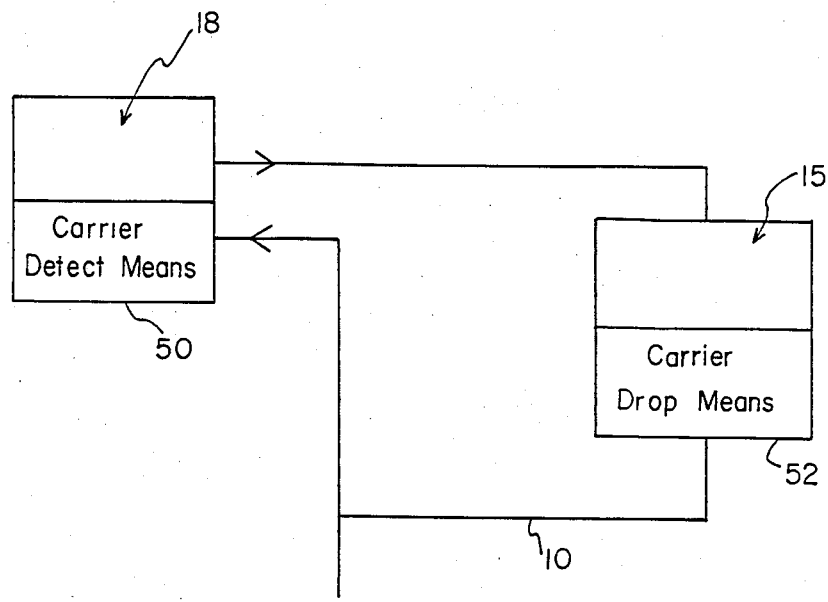

As seen in FIG. 11, a carrier detect 50 is associated with each of the listening stations for continuously monitoring the transmission media for energy. This device will detect any drop in the RF carrier. RF carrier drop means 52 associated with central station 15 interrupts the RF carrier. Every station is designed to detect a collision whenever the Carrier Detect deactivates. This will also cause the end of every normal (noncollision) packet to look like a collision, but a timer built into the stations ignores collisions received later than a certain time. The dynamics of the network insure that all collisions will be over within a certain time from the beginning of the packet.

While a specific embodiment of the invention has been shown and describe in detail to illustrate the application of the principles of the invention, it will be understood that the invention may be embodied otherwise without departing from such principles.

What is claimed is:

1. A collision signal detection system for shared-multi-user, frequency-division-multiplexed transmission media comprising:
   a plurality of stations connected to the shared, multi-user, frequency-division-multiplexer transmission media, receiving and transmitting signals including data signals within a databand;
   collision signal means associated with each of said plurality of stations for sending a collision enforcement signal from one of said plurality of stations to the other ones of the plurality of stations after a data collision has been detected at said one of said plurality of stations, said collision enforcement signals having a frequency within the data band;
   signal detection means associated with at least one of said plurality of stations for receiving an input signal and for detecting said collision enforcement signal.

2. A collision signal detection system for shared, multi-user, frequency-division-multiplexed transmission media according to claim 1 wherein: said at least one of said plurality of stations is a central station with all signals passing through said central station detection means.

3. A collision signal detection system for shared, multi-user, frequency-division-multiplexed transmission media according to claim 1 wherein: each of said plurality of stations includes said detection means.

4. A collision signal detection system for shared, multi-user, frequency-division-multiplexed transmission media according to claim 1 wherein, said signal detection means includes: means for recovering a carrier.

5. The collision signal detection means for shared, multi-user, frequency-division-multiplexed transmission media according to claim 1 wherein, said signal detection means includes: means for recovering a correct carrier from the transmitted data when there is only one of said plurality of stations transmitting and for producing a carrier at the correct frequency when there are multiple stations transmitting and to produce a carrier at the correct frequency when the collision enforcement signal is received.

6. A collision signal detection system for shared, multi-user, frequency-division-multiplexed transmission media according to claim 5 wherein, said signal detection means further includes: means for shifting the phase of said recovered carrier.

7. A collision signal detection system for shared, multi-user, frequency-division-multiplexed transmission media according to claim 6 wherein, said signal detection means further includes: means for multiplying the phase shifted recovered carrier with said input signal.

8. A collision signal detection system for shared, multi-user, frequency-division-multiplexed transmission media according to claim 1 wherein, said signal detection means includes: means for detecting when one station is transmitting data and there is no collision, means for detecting when collision enforcement is being transmitted regardless of data transmission, and means for having a probability of detecting a collision condition when multiple stations are transmitting and there is no collision enforcement.

9. A collision signal detection system for shared, multi-user, frequency-division-multiplexed transmission media comprising: a plurality of stations, connected to the shared, multi-user, frequency-division-multiplexed transmission media, receiving and transmitting signals including data signals within a data band; a signal generator, associated with each of said plurality of stations, adapted to produce a collision enforcement signal having a frequency within the data band in response to the detection of a collision; and, detection means for detecting when one of station is transmitting data and there is no collision, for detecting when collision enforcement is being transmitted regardless of data transmission, and to have a probability of detecting a collision condition when multiple stations are transmitting and there is no collision enforcement.

10. A collision signal detection system for shared, multi-user, frequency-division-multiplexed transmission media according to claim 9 wherein: said detection means is associated with a single central station with all signals passing through said central station detection means.

11. A collision signal detection system for shared, multi-user, frequency-division-multiplexed transmission media according to claim 9 wherein: each of said plurality of stations includes said detection means.

12. A collision signal detection system for shared, multi-user, frequency-division-multiplexed transmission media comprising:
- a plurality of listening stations connected to the shared, multi-user, frequency-division-multiplexer transmission media, receiving and transmitting signals including data signals within a databand;
- collision signal means associated with each of said plurality of listening stations for sending a collision enforcement signal from one of said plurality of listening stations to the other ones of the plurality of stations after a data collision has been detected at said one of said plurality of listening stations, said collision enforcement signal having a frequency within the data band;
- a central station having an input connected with the input of each of said listening stations with all signals passing through said central station; and,
- signal detection means associated with said central station for receiving an input signal and for detecting said collision enforcement signal.

13. A collision signal detection system for shared, multi-user, frequency-division-multiplexed transmission media according to claim 12 further comprising:
- carrier detect means associated with each of said listening stations for continuously monitoring the transmission media for energy;
- RF carrier drop means associated with said central station for interrupting a carrier.

* * * * *